Jan. 17, 1967  H. D. LONGNECKER  3,298,529
SLUDGE REMOVAL MEANS FOR SEDIMENTATION APPARATUS
Filed May 18, 1964  2 Sheets-Sheet 2
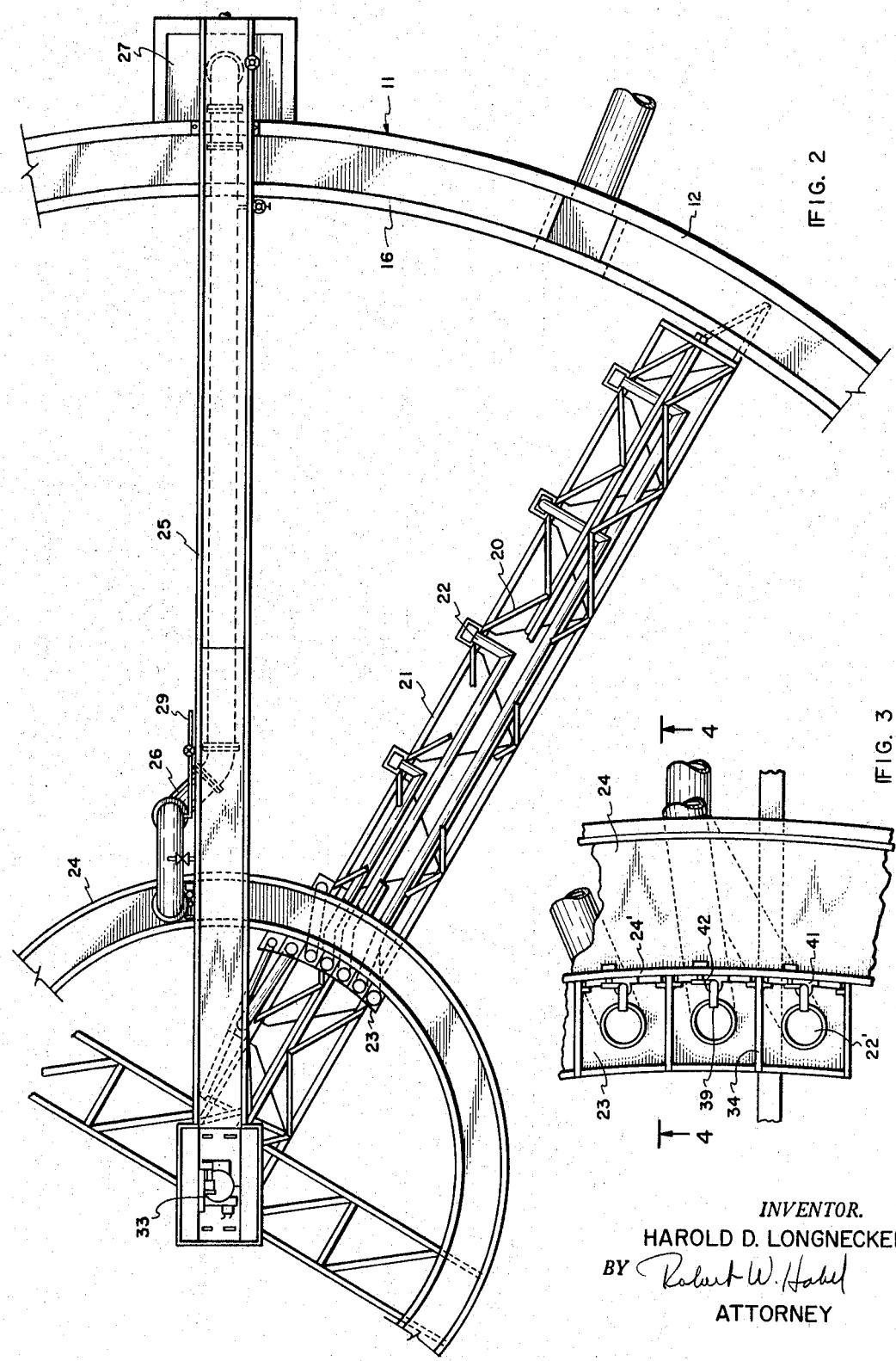
INVENTOR.
HAROLD D. LONGNECKER
BY Robert W. Habel
ATTORNEY United States Patent Office 3,298,529
Patented Jan. 17, 1967

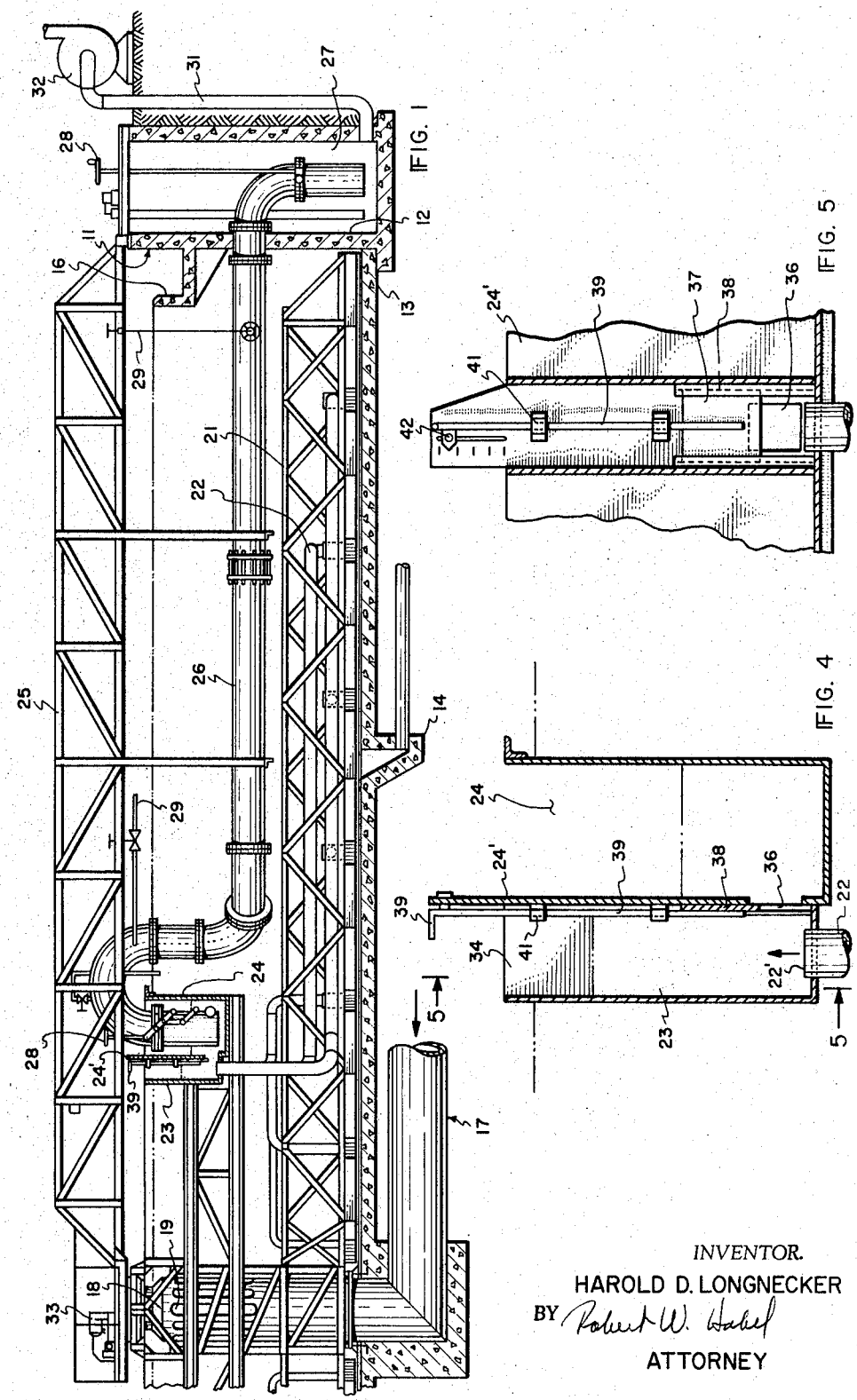

3,298,529
SLUDGE REMOVAL MEANS FOR
SEDIMENTATION APPARATUS
Harold D. Longnecker, Burlingame, Calif., assignor to
The Eimco Corporation, Salt Lake City, Utah, a corporation of Delaware
Filed May 18, 1964, Ser. No. 368,035
7 Claims. (Cl. 210—533)

This invention relates generally to the field of sedimentation and in particular to sedimentation or clarification apparatus provided with improved ways and means enabling the rapid removal of settled sludge collecting on the bottom of the sedimentation tank by forcing it through uprising tubes under the influence of a hydrostatic head imposed by the overlying mass of liquid in the tank.

Clarifiers of this general type have been used for many years and have taken a variety of forms. One such prior design comprises a tapered ported conduit rotatably mounted to sweep the floor of the tank. The ports are spaced along the bottom of the conduit and sludge settling on the floor of the tank is forced by hydrostatic pressure through the ports and along the conduit to a central discharge point.

One disadvantage of such apparatus is that there is no provision to control the rate of solids withdrawal at the various discharge ports in proportion to different solids concentration across the floor of the tank as a result of varying rates of solids settling.

Another typical design comprises a sedimentation tank, including a rake structure for slow rotation about the tank axis and blades for working solids collecting on the floor, provided with a plurality of uprising draw-off pipes supported and rotated about the center column by the rake structure with their inlet ends adjacent the tank floor whereby sludge is forced upwardly through the conduits and is delivered to a common collecting sump for eventual removal from the clarifier.

Although this design has found wide acceptance it still leaves certain things to be desired from a commercial standpoint. This is due to the fact that the sludge withdrawal rate is effectively controlled only by separate valves on each conduit to regulate its sludge discharge rate. The sludge withdrawal control thus effected is entirely independent of the rate at which collected sludge is eventually discharged from the collecting sump. As a result, increased sludge production cannot be accommodated except by resort to adjustment of each valve. This is a messy, troublesome and expensive proposition which at best gives only approximate regulation due to the usual inaccessibility to the valves themselves.

Accordingly, it is the primary object of the present invention to provide a clarifier construction and a means of operating the same which attain all the advantages of previously available hydrostatic pressure sludge removal clarifiers yet overcome the disadvantages inherent in such prior designs.

It is an important object of the invention to provide a clarifier enabling removal of sludge by hydrostatic pressure and of improved inexpensive construction with easily accessible control valves for individual draw-off tubes, such valves being physically disconnected from such tubes but functionally operable therewith.

Another object is to provide a valving system capable, at any given valve setting, of accommodating a wide range of sludge production or withdrawal rates.

The foregoing and possibly other objects and advantages of the invention will be apparent to those skilled in the field to which it pertains by a perusal of the accompanying drawings and the following description thereof, all of which are offered by way of example only and not in limitation of the invention, the scope of which is defined by the appended claims rather than by any detailed description.

In the drawings:

FIG. 1 is a partial side sectional view of a clarifier embodying the invention.

FIG. 2 is a top plan view of the structure of FIG. 1, certain structural elements being omitted for purposes of clarity.

FIG. 3 is an enlarged top elevational view of a portion of the sludge receiving sump and associated valving mounted in the center of the clarifier of FIGS. 1 and 2.

FIG. 4 is a sectional view taken in the plane of line 4—4 of FIG. 3.

FIG. 5 is a sectional view taken in a plane of line 5—5 of FIG. 4.

In such drawings, the invention is shown as comprising a tank, generally designated 11, formed from upstanding marginal sidewalls 12 and a bottom 13 which is provided with a clean-out pit 14. The tank is additionally equipped with a peripheral overflow weir 16 from which clarified liquid is withdrawn; and a feed inlet conduit 17 by which feed is introduced into an upstanding center pier 18 provided with feed ports 19.

Mounted for rotation about the center column is a rake arm with associated rake blades all generally designated 21, the rake blades defining sludge concentrating areas each of which is serviced by one of the individual conduits 22 which rotate with the rake arms and are interconnected with an inlet sump 23 which is in turn mounted on a center rotating ring 24 that rotates with the rake arms.

The tank is provided with a conventional walkway 25 spanning the distance between the center column and the peripheral wall and from this is rigidly hung a withdrawal syphon conduit 26 which dips into the rotating trough or ring 24 to terminate at an elevation therein below the level of the weir 16, and terminates at its opposite end in the bottom portion of an outside collecting pit 27 at an elevation below that of the rotating ring. The syphon conduit is provided with control valves as at 28 to regulate the withdrawal volume and rate and with additional valves as at 29 to aid in starting and stopping syphon action in known fashion. Sludge is removed from the outside pit through conduit 31 and pump 32.

Operation of the clarifier thus far described is well known and employs the usual drive mechanism 33 atop the center column to enable driving of the rake and rotating center ring.

It will be noted, however, that the blade members 20 on the rake assembly 21 are arranged with alternate slopes so that adjacent blades connect to each other to form a series of adjacent collecting zones in which sludge is collected for subsequent withdrawal by the conduits 22.

The unique valving arrangement of the invention is best shown in FIGS. 3–5 taken in conjunction with FIGS. 1–2 which show the general location thereof.

As is evident, all of the sludge withdrawal conduits discharge into individual compartments defined by baffles 34 in the sludge receiving sump 23 on the inboard side of the rotating ring 24. It will be further noted that the conduit 22 terminates adjacent the very bottom of the chambers thus defined. Each chamber communicates with the interior of the rotating ring through its individual valve located in the bottom thereof. In the illustrated embodiment, the valve comprises a port 36 in the wall 24' of the ring and a sliding gate 37 mounted in trackways 38 for up and down movement to cover and uncover the port. The valve gate 37 is controlled by simple rod 39 which passes through suitable brackets 41 and is equipped at the top with a pointer 42 which conveniently marks the degree of opening of the port in graduation on the sidewall extension.

As previously noted, the sludge withdrawal conduit 26 dips into the main portion of the ring 24 beneath the normal level of sludge therein.

With this arrangement, the pressure of the overlying body of liquid in the tank proper forces sludge through the conduits 22 to discharge upwardly into the bottom of the initial sludge receiving sump 23 and the rate of discharge is thus initially controlled by the head of sludge above the outlet 22' of the sludge conduit in the bottom of each individual compartment in the sump. Sludge from the sump passes into the ring collection launder 24 through port 36 where it joins with sludge coming from the other individual chambers and is thereafter withdrawn through conduit 26 to collecting pit 27.

With a full tank, the syphon primed and the collection pit 27, sludge sump 23 and ring collection launder 24 all at the same level and pump 32 off stream, there is no hydrostatic head differential between the various elements. When pump 32 goes on stream sludge flows from the bottom of collection pit 27 thus reducing the level in the pit and creating a differential head between the pit and the collecting launder 24. This difference causes flow through the conduit 26 reducing the level in the ring 24 and creating a head differential between it and the individual compartments in sump 23. Flow then begins through the submerged orifices 36 to the ring 24 thus reducing the level in compartments and creating a head differential between the compartments and the main tank. At this point flow begins from the tank bottom to the sludge compartments via the conduits 22. Any increase in the flow through pump 32 in turn increases the several head differentials by further lowering the levels in the outside collection pit 27, thus increasing the sludge withdrawal rate. Conversely, a decrease in the flow through pump 32 decreases sludge withdrawal rate. The control gates 37 function to distribute and proportion the flow throughout the tank which may be regulated simply by raising or lowering the gates. Once the control gates are initially set for proper sludge flow distribution the pumping rate will regulate total flow variations without re-adjustment of the individual gates.

It can be seen that if the sludge withdrawal rate through the fixed conduit 26 increases it will result in the lowering of the quantity of sludge in the ring 24, thus increasing the head between that section and the individual sections in the sump whereby greater quantity of sludge will be forced through the ports 36 in turn reducing the head over the sludge outlet ports 22 and increasing the withdrawal rate from the bottom of the tank.

Location of the outlet port 22' and the port 36 at a relatively low level is important and it is also important that the effective opening of the port 36 be variable because it is with this combination that the rate of withdrawal through the individual conduits 22 is readily regulated yet at the same time the entire arrangement has a built in accommodation for varying sludge withdrawal rates. In other words, each of the individual ports can be adjusted to a desired flow to maintain equilibrium in the clarifier on an overall basis. If sludge withdrawal rate is increased due to increased sludge production the individual compartments will accommodate such increase at least temporarily until the upper limit is reached which would occur when the height is sufficient to counter-balance the hydrostatic head in the tank proper and the degree of difference between the individual compartments and the sludge level in the ring 24. Similarly if the sludge withdrawal rate is decreased sludge will still report to the receiving sumps because the head overlying the sludge discharge port 22 will automatically be reduced as sludge is continually withdrawn from the ring section 24. This is quite different from the usual valve which has a fixed resistance to flow.

From the foregoing it is apparent that the present invention provides a unique and highly useful sludge withdrawal arrangement for use in hydrostatic pressure type sludge removal clarifiers that enables individual control over the conduits serving different areas on the tank bottom and yet at the same time provides for automatic accommodation of varying sludge withdrawal rates.

What is claimed is:

1. Sedimentation apparatus comprising a tank adapted to hold a body of liquid having a predetermined normal liquid level and a settled sludge blanket and having a feed inlet, a clarified effluent outlet and sludge removal means; said sludge removal means comprising a first and a second sludge receiving compartment the bottoms of which are below said predetermined liquid level, a sludge conveying conduit extending downwardly from the lower portion of said first sludge receiving compartment to the level of settled sludge in said tank for conveying said sludge to said first sludge receiving compartment, means for withdrawing sludge from said second sludge receiving compartment, and port means providing communication between the lower portions of said first and second sludge receiving compartments said port means being adjustable to maintain a normal sludge level in said first sludge receiving compartment above said port.

2. Apparatus according to claim 1 with the addition of at least one additional first sludge receiving compartment, a sludge conveying conduit extending downwardly from each of said additional first sludge receiving compartments to terminate at an inlet at the level of settled sludge in the tank at a location laterally spaced from other sludge conduit inlets at said level, and adjustable port means providing communication between the lower portion of each of said additional first sludge receiving compartments and the lower portion of said second sludge receiving compartment.

3. Sedimentation apparatus according to claim 1 wherein said port means includes an orifice and an adjustable sliding gate mounted for up and down movement over said orifice.

4. Sedimentation apparatus according to claim 1 further comprising a syphon sludge withdrawal conduit communicating with a lower portion of said second sludge receiving compartment.

5. Sedimentation apparatus comprising a tank, means for maintaining a predetermined liquid level in said tank said means including a feed inlet, a clarified effluent outlet, and settled sludge removal means; said sludge removal means comprising a support arm extending radially from the tank center over the tank bottom and mounted for rotation about said center, a plurality of first sludge receiving compartments mounted for movement with said arm and being positioned with the bottoms of said compartments at an elevation below said predetermined liquid level, an open-ended sludge conveying conduit extending downwardly from a lower interior portion of each of said first sludge receiving compartments to terminate adjacent the tank bottom with the lower ends of adjacent ones of said sludge conveying conduits being spaced apart, a second sludge receiving compartment mounted for movement with said first sludge receiving compartments and having a bottom at an elevation below said predetermined liquid level, sludge discharge means for removing sludge from said second sludge receiving compartment, and separate port means providing communication between the lower portion of each of said first sludge receiving compartments and said second sludge receiving compartment, said port means being adjustable to maintain a sludge level in said first sludge receiving compartment above said port means.

6. Sedimentation apparatus according to claim 5 with the addition of rake means mounted on said arm to concentrate sludge on the bottom of the tank in zones adjacent the lower ends of said sludge conveying conduits.

7. Sedimentation apparatus according to claim 5 in which said second sludge receiving compartment is an annular trough mounted concentrically about the tank center.

References Cited by the Examiner

UNITED STATES PATENTS

| 2,922,524 | 1/1960 | Rankin | 210—528 X |
| 2,966,268 | 12/1960 | Lind et al. | 210—528 X |
| 3,166,502 | 1/1965 | Kelly | 210—528 |

FOREIGN PATENTS

| 523,876 | 7/1940 | Great Britain. |

REUBEN FRIEDMAN, *Primary Examiner.*

D. M. RIESS, *Assistant Examiner.*